United States Patent Office 3,046,845
Patented July 31, 1962

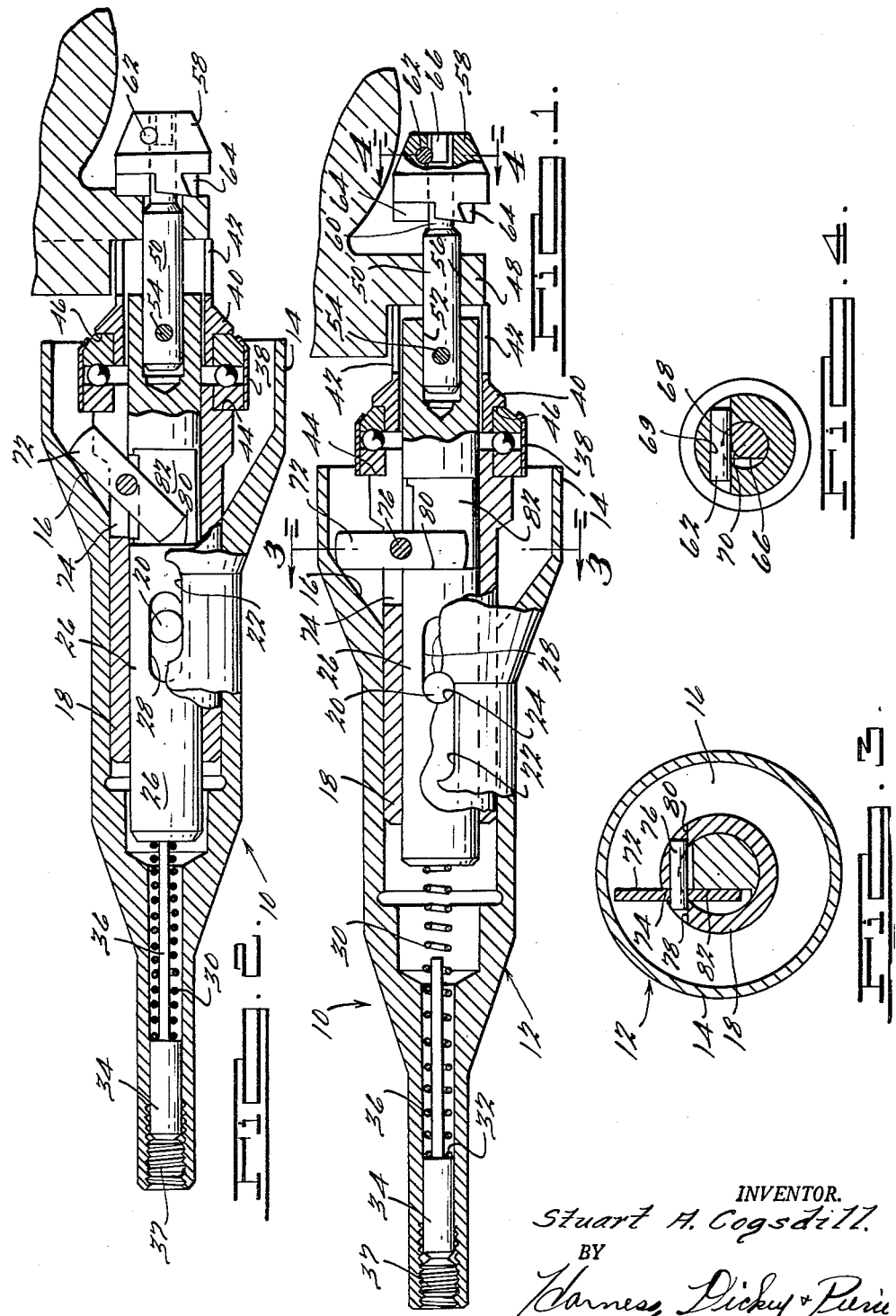

3,046,845
BACK SPOTFACE TOOL
Stuart A. Cogsdill, Orchard Lake, Mich., assignor to Cogsdill Tool Products, Inc., Oak Park, Mich.
Filed Aug. 17, 1959, Ser. No. 834,016
11 Claims. (Cl. 90—11)

This invention relates to cutting tools and particularly to a cutting tool that will spotface or counterbore the backside of a workpiece around a bore extending therethrough.

It is one object of the present invention to provide a cutting tool that can spotface the back or underside of a workpiece from a position above the workpiece.

It is another object of the invention to provide a cutting tool that can be mounted on the driving arbor of a drill press, advance a tool holder downwardly through a bore in a workpiece, abuttingly engage the upperside of the workpiece, and move a rotary cutter mounted on the lower end of the tool holder upwardly in response to the downward movement of the driving arbor to spotface the underside of the workpiece around said bore.

It is a further object of the invention to provide a cutting tool having a spindle with a rotary cutter on the lower end thereof which is cammed upwardly in response to the downward movement of a driving member disposed about the spindle to enable the rotary cutter to spotface the underside of a workpiece.

It is a still further object of the invention to provide a cutting tool for spotfacing the back or underside of a workpiece which can be easily adjusted to accommodate workpieces of different thicknesses, and to vary the depth of cut.

It is a still further object of the invention to provide a cutting tool for spotfacing the back or underside of a workpiece which is economical to manufacture, rugged and dependable in operation, and simple in construction and easy to use.

Other objects and features of novelty of the invention will be specifically pointed out or otherwise become apparent when referring, for a better understanding of the invention, to the following description taken in conjunction with the accompanying drawings wherein:

FIGURE 1 is a sectional view of a cutting tool embodying features of the present invention in its retracted position;

FIG. 2 is a sectional view of the cutting tool illustrated in FIG. 1 in its advanced cutting position;

FIG. 3 is a sectional view of the structure illustrated in FIG. 1, taken along the line 3—3 thereof, and FIG. 4 is a sectional view of the structure illustrated in FIG. 1, taken along the line 4—4 thereof.

Referring to the drawings, a cutting tool 10 embodying features of the present invention is illustrated. It is comprised of a drive member 12 having the upper end thereof adapted to be fixed to the driving arbor of a drill press. The lower end of the drive member 12 is flared outwardly to provide an enlarged cylindrical portion 14 on the lower end thereof and a frustro-conical cam surface 16 on the inner surface thereof immediately above the cylindrical portion 14.

A sleeve 18 is slidably disposed within the drive member 12 and is slidably keyed thereto by a pin 20 extending through a longitudinal slot 22 in the wall of the drive member 12. The sleeve 18 has an aperture 24 therein for receiving the pin 20 in a manner to prevent movement of the pin relative to the sleeve. A spindle 26 is slidably disposed within the sleeve 18 and is slidably keyed thereto by a diametrical slot 28 through which the pin 20 extends. With this construction both the drive member 12 and spindle 26 are slidably keyed to the sleeve 18 by the pin 20 and each can move longitudinally a limited distance relative to the sleeve 18.

A suitable coil spring 30 is disposed within the upper end of the drive member 12 with the lower end thereof bearing against the upper end of the spindle 26 and the upper end thereof bearing against a shoulder 32 of a plunger 34 having a stem 36 extending downwardly through the convolutions of the spring 30. The upper end of the plunger 34 abuttingly engages a plug 37 screwed into the upper end of the drive member 12 in a manner to enable its axial position to be varied. With this construction, the spring 30 urges the spindle 26 and drive member 12 apart so that they normally assume the retracted position illustrated in FIG. 1 wherein the pin 20 engages the upper end of the slot 28 in the spindle, and the lower end of the slot 22 in the drive member. When the sleeve 18 is fixed against axial movement, the drive member 12 can be advanced downwardly by the driving arbor of the drill press to compress the spring 30 until the stem 36 abuts against the upper end of the spindle, as illustrated in FIG. 2, and as will be described in greater detail hereinafter.

The lower end of the sleeve 18 has the upper race of a ball bearing 38 secured thereto, and a rotating stop collar 40 having a plurality of slots 42 in the wall thereof is press fit within the lower race of the ball bearing 38. The sleeve 18 has a downwardly presenting shoulder 44 thereon engaging the upper race of the ball bearing and the stop collar 40 has an upwardly presenting shoulder 46 thereon engaging the lower race to prevent the stop collar from moving upwardly when the lower end thereof abuts against the upper surface of a flange 48 of a workpiece, as illustrated in FIGS. 1 and 2.

A cylindrical tool holder 50 has the upper end thereof pinned within a bore 52 in the lower end of the spindle 26 by a pin 54 and extends downwardly through an aperture 56 in the flange 48. A suitable rotary cutter 58 is slidably disposed over a reduced end portion 60 on the lower end of the tool holder and is secured thereto by a pin 62 which extends through opposed semi-circular grooves 68 and 69 in the reduced end portion 60 and rotary cutter 58, respectively. The upper end of the rotary cutter 58 has a plurality of cutting teeth 64 thereon which are adapted to spotface the underside of the flange 48 when the cutting tool is moved upwardly into engagement therewith, as will be described, and rotated in a counterclockwise direction, as viewed in FIG. 4.

Referring to FIG. 4, as well as FIG. 1, the reduced end portion 60 of the tool holder is provided with a flat portion 66 disposed in a plane extending transversely to the axis of the pin 62 which blends into the semicircular groove 68 along a curved surface 70 formed on a radius struck from the center of the reduced end portion 60. With this construction the rotary cutter 58 can be rotated through 90° in a counterclockwise direction as viewed in FIG. 4 so that the pin 62 overlies the flat portion 66, and then slid downwardly to be removed from the reduced end portion 60. Conversely, after the tool holder 50 has been projected through the bore 56 of the flange 48, as will be described, the rotary cutter can be quickly slipped over the end of the reduced end portion 60 with the pin 62 overlying the flat portion 66, and thereafter rotated in a clockwise direction, as viewed in FIG. 4, to feed the pin 62 around the shoulder 70 and into the semicircular groove 68. In this position, the rotary cutter, of course, cannot move axially relative to the tool holder 50, and since the reaction from the cutting engagement of the cutting teeth 64 with the underside of the flange 48 is in a clockwise direction, as viewed in FIG. 4, the pin 62 will remain in the position illustrated and will not disengage itself. This construction provides a simple quick disconnect for mounting and removing the rotary cutter on the reduced end portion 60 of the tool holder 50.

Referring to FIGS. 1 and 3, in particular, a camming member 72 is pivotally mounted within a slot 74 in the wall of the sleeve 18 by a pin 76 suitably secured within aligned apertures 78 and 80 in the wall of the sleeve 18. In the retracted position, illustrated in FIG. 1, the outer end of the camming member 72 engages the cam surface 16 and the inner end thereof engages a downwardly presenting shoulder 80 adjacent the upper end of a vertical flat 82 formed on the spindle 26 and extending in a plane parallel to the plane in which the cutting member 72 pivots.

In operation, the cutting tool 10 is rotated and moved downwardly by the driving arbor of a drill press until the rotary stop collar 42 abuts against the upper surface of the flange 48 to limit the downward advancement of the sleeve 18 in a manner that does not interfere with the rotation of the cutting tool. The rotary cutter 58 can then be quickly and easily mounted on the reduced end portion 60 as already described. Continued downward advancement of the drive member 12 pivots the camming member 72 in a clockwise direction as viewed in FIGS. 1 and 2 and the left end of the camming member cams the spindle 26 upwardly to advance the rotary cutter 58 into cutting engagement with the back or underside of the flange 48, the upward movement of the rotary cutter 58 terminating when the upper end of the spindle 26 engages the stem 36 of the plunger 34. To compensate for a flange 48 of a different thickness, or to vary the depth of cut, the threaded plug 37 can be raised or lowered to vary the position of the plunger 34 which, of course, varies the point at which the upper end of the spindle 26 engages the stem 36.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A cutting tool comprising a sleeve, a spindle slidably keyed within said sleeve for limited longitudinal movement relative thereto, a drive member slidably extending over said sleeve and slidably keyed for limited longitudinal movement relative thereto, and pivoted camming means for camming said spindle upwardly relative to said sleeve in response to the downward movement of said drive member relative to said sleeve.

2. A cutting tool comprising a sleeve, a spindle slidably mounted within said sleeve and slidably keyed for limited longitudinal movement relative thereto, a drive member slidably disposed over said sleeve and slidably keyed for limited longitudinal movement relative thereto, and a camming member pivotally mounted on said sleeve having one end thereof engaging said drive member and the other end thereof engaging said spindle.

3. A cutting tool comprising a sleeve, a spindle slidably mounted within said sleeve and slidably keyed for limited longitudinal movement relative thereto, a drive member slidably disposed over said sleeve and slidably keyed for limited longitudinal movement relative thereto, a camming member pivotally mounted on said sleeve and having one end thereof engaging said drive member and the other end thereof engaging said spindle, and resilient means acting between said spindle and said drive member to urge them apart whereby when said drive member is longitudinally advanced relative to said sleeve it will pivot the camming member to retract the spindle relative to said sleeve and compress said resilient means.

4. The invention as defined in claim 3 including adjustable means for limiting the downward advancement of said drive member relative to said sleeve and the upward retraction of said spindle relative to said sleeve to vary the depth of cut of the cutting tool and accommodate workpieces of different thicknesses.

5. A cutting tool comprising a sleeve, a drive member having the lower end thereof slidably disposed over the upper end of said sleeve and slidably keyed for limited longitudinal movement relative there, a spindle slidably disposed within said sleeve and slidably keyed for limited longitudinal movement relative thereto, a downwardly presenting shoulder formed on a portion of said spindle, a longitudinally extending slot formed in the wall of said sleeve adjacent said shoulder, a camming member pivotally mounted within said slot and having one end extending inwardly and engaging said shoulder and the other end extending outwardly of said sleeve, a cam surface on the lower end of said drive member engaging said other end of the camming member, and spring means acting between said spindle and drive member to normally urge the spindle downwardly relative to said sleeve and the drive member upwardly relative to said sleeve and pivot said camming member in one direction, whereby when said drive member is advanced downwardly relative to said sleeve it will pivot the camming member in the other direction to retract the spindle upwardly relative to said sleeve.

6. The invention as defined in claim 5 including adjustable means for limiting the downward advancement of said drive member relative to said sleeve and the upward retraction of said spindle relative to said sleeve to vary the depth of cut of the cutting tool and accommodate workpieces of different thicknesses.

7. The invention as defined in claim 5 including a plunger slidably disposed in the upper end of said drive member and having a stem extending downwardly into position to be engaged by the upper end of said spindle when said drive member is advanced downwardly relative to said sleeve to limit the downward movement of the drive member and upward movement of the spindle, a plug adjustably secured within the upper end of said drive member and engaging said plunger to adjustably limit the upward movement thereof, and wherein said resilient means comprises a spring disposed about said stem and acting between said plunger and the upper end of said spindle.

8. The invention as defined in claim 5 including a rotary stop collar rotatably mounted on and projecting downwardly from the lower end of said sleeve, a cylindrical tool holder secured to the lower end of said spindle and projecting downwardly therefrom beyond the end of said rotary stop collar and adapted to extend through a bore in a workpiece, and a rotary cutter having a plurality of cutting teeth on the upper end thereof releasably mounted on the lower end of said tool holder.

9. A cutting tool comprising a sleeve, a drive member slidably disposed over the upper end of said sleeve, a spindle slidably disposed within said sleeve, said drive member and spindle each having a longitudinally extending slot therein, a pin extending radially through said slots and through an aperture in said sleeve, spring means acting between the upper end of said spindle and said drive member to urge the spindle downwardly until the upper end of the slot therein engages said pin and to urge the drive member upwardly until the lower end of the slot therein engages said pin, a longitudinally extending slot formed in the wall of said sleeve, a recess formed in said spindle adjacent the slot in said sleeve and having a downwardly presenting shoulder adjacent the upper end thereof, a camming member pivotally mounted in the slot in said sleeve and having one end thereof projecting inwardly into said recess and engaging said downwardly presenting shoulder, the other end of said camming member projecting outwardly from said sleeve, and a cam surface on the lower end of said drive member engaging said other end of the camming member whereby said drive member can be advanced downwardly relative to said sleeve when the sleeve is fixed against downward movement to rotate the camming member to retract the spindle upwardly relative to said sleeve.

10. The invention as defined in claim 9 including adjustable means for limiting the downward advancement of said drive member relative to said sleeve and the upward retraction of said spindle relative to said sleeve to vary the depth of cut of the cutting tool and accommodate workpieces of different thicknesses.

11. The invention as defined in claim 9 including a plunger slidably disposed in the upper end of said drive member, a plug adjustably secured within the upper end of said drive member and engaging said plunger to adjustably limit the upward movement thereof, said plunger having a stem extending downwardly into position to be engaged by the upper end of said spindle when said drive member is advanced downwardly relative to said sleeve to limit the downward movement of the drive member and upward movement of the spindle, and wherein said spring means comprises a spring disposed about said stem and acting between said plunger and the upper end of said spindle.

References Cited in the file of this patent

UNITED STATES PATENTS

| | | |
|---|---|---|
| 2,442,720 | Brantingham | June 1, 1948 |
| 2,773,402 | Edens | Dec. 11, 1956 |
| 2,855,811 | Fried | Oct. 14, 1958 |

FOREIGN PATENTS

| | | |
|---|---|---|
| 933,120 | Germany | Sept. 15, 1955 |